US005568880A

United States Patent [19]

DiBartolomeo

[11] Patent Number: 5,568,880

[45] Date of Patent: Oct. 29, 1996

[54] COMPARTMENTALIZED VITAMIN DISPENSING SYSTEM

[76] Inventor: Ronnie C. DiBartolomeo, P.O. Box 408, Monterey, Calif. 93942

[21] Appl. No.: 509,433

[22] Filed: Jul. 31, 1995

[51] Int. Cl.[6] .................... B65G 59/00

[52] U.S. Cl. .................... 221/131; 222/135

[58] Field of Search .................... 221/124, 131, 221/198; 222/135, 136, 145.1, 145.3

[56] References Cited

U.S. PATENT DOCUMENTS

| | | | |
|---|---|---|---|
| 4,775,077 | 10/1988 | Capotorto | 221/131 |
| 5,497,914 | 3/1996 | Maltsis | 222/135 |

*Primary Examiner*—Kenneth Noland

[57] ABSTRACT

A new and improved compartmentalized vitamin dispensing system for use in association with vitamins and minerals in either liquid or powdered form, the apparatus comprising, in combination: a housing unit formed as a hollow rectangular shaped box, the hollow interior being divided into a plurality of dispensing columns, the housing unit including a lower wall angled in a downward direction from each side edge to the approximate centerpoint thereof; a plurality of dispensing tubes, each tube being positioned in a dispensing column and adapted to contain vitamins and minerals therein, each tube including an aperture at its lowermost extent; and a plurality of dispensing knobs, each including a valve rotatably coupled below the dispensing tubes, each valve including a device to retain and dispense materials residing in the dispensing tubes upon turning of the knobs, materials dispensed being caused to slide down the lower wall, a spout extending through the center point of the lower wall, the spout including a device to permit retainment and dispensing of materials therethrough.

6 Claims, 4 Drawing Sheets

COMPARTMENTALIZED VITAMIN DISPENSING SYSTEM

BACKGROUND OF THE INVENTION

1. Field of the Invention

The present invention relates to a compartmentalized vitamin dispensing system and more particularly pertains to dispensing controlled quantities of vitamins and minerals in liquid and solid forms from the individual compartments of the apparatus.

2. Description of the Prior Art

The use of dispensing devices is known in the prior art. More specifically, dispensing devices heretofore devised and utilized for the purpose of dispensing a plurality of different substances in varying quantities are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,775,077 to Capotorto a vitamin dispenser.

U.S. Pat. No. 4,927,059 to Fiedler discloses a device for dispensing a multicomponent flowable substance.

U.S. Pat. No. Des. 324,619 to Comstuck discloses a multiple dispenser for liquid soap, shampoo, lotion, and the like.

U.S. Pat. No. Des. 245,670 to Clover, Jr., discloses a vitamin dispenser.

U.S. Pat. No. Des. 274,040 to Ridgley discloses a vitamin dispenser.

Lastly, U.S. Pat. No. Des. 279,864 to Ridgley discloses a vitamin pill dispenser.

In this respect, the compartmentalized vitamin dispensing system according to the present invention substantially departs from the conventional concepts and designs of the prior art, and in doing so provides an apparatus primarily developed for the purpose of dispensing controlled quantities of vitamins and minerals in liquid and solid forms from the individual compartments of the apparatus.

Therefore, it can be appreciated that there exists a continuing need for a new and improved compartmentalized vitamin dispensing system which can be used for dispensing controlled quantities of vitamins and minerals in liquid and solid from the individual compartments of the apparatus. In this regard, the present invention substantially fulfills this need.

SUMMARY OF THE INVENTION

In view of the foregoing disadvantages inherent in the known types of dispensing devices now present in the prior art, the present invention provides an improved compartmentalized vitamin dispensing system. As such, the general purpose of the present invention, which will be described subsequently in greater detail, is to provide a new and improved compartmentalized vitamin dispensing system and method which has all the advantages of the prior art and none of the disadvantages.

To attain this, the present invention essentially comprises a new and improved compartmentalized vitamin dispensing system for use in association with vitamins and minerals in either liquid or powdered form, the apparatus comprising, in combination: a housing unit formed as a hollow generally rectangular shaped box with a front wall, a rear wall, two side walls, an upper wall and a lower wall, the rear wall having a greater height than the front wall and including two hanging slots positioned adjacent to its uppermost extent, the hollow interior of the housing unit being divided into a plurality of dispensing columns, adjacent dispensing columns being separated by vertical dividers to prevent the mixing of vitamins and minerals positioned therein, the front wall having an upper region including a plurality of insertion tubes extending within the dispensing columns, each tube including a removable cap, the insertion tubes permitting the placement of liquid or powdered vitamins and minerals into each dispensing column, the lower region of the front wall including a plurality of elongated transparent windows and incremental markers, the lower wall being angled in a downward direction from each side edge to the approximate centerpoint thereof, one side wall including a generally cylindrical shaped cup dispenser, the dispenser adapted to retain and dispense disposable cups therefrom; a plurality of dispensing tubes, each formed in an elongated cylindrical configuration, each tube being positioned through the upper wall and secured in a dispensing column, each tube including an upper section, a lower section and a central section therebetween, each upper section being formed contiguously with an insert tube to permit the replenishment of vitamins and minerals residing in the lower section of each tube, the lowermost extent of the lower section including an aperture; a plurality of plunger devices, each comprising a head, a knob having resilient means and a cylindrical rod therebetween, a plunger device being positioned axially within the upper and central sections of each dispensing tube with the head located at the approximate centerpoint thereof, the plunger adapted to be pushed downward to force fluid and powder positioned within the tube in a downward direction, the resilient means forcing the plunger back to its original position after depression; a plurality of dispensing knobs, each including a valve rotatably coupled below the dispensing tubes of the apparatus, the valves including means to retain and dispense materials residing in the dispensing tubes upon turning of the knobs, a rounded trough being positioned below the valves and affixed to the downwardly angled lower wall, the trough causing materials deposited therein to roll toward the centerpoint of the lower wall, the knob including means to preset the amount of vitamins and minerals to be dispensed upon turning of the knob; and a dispensing spout formed in a cylindrical configuration and extending vertically from the approximate centerpoint of the lower wall, the spout including an axial aperture with a valve positioned therein, the valve being rotatably coupled within the spout and including a handle extending through the spout, the valve including means to retain and dispense vitamins and minerals upon turning of the handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compartmentalized vitamin dispensing system which has all of the advantages of the prior art dispensing devices and none of the disadvantages.

It is another object of the present invention to provide a new and improved compartmentalized vitamin dispensing system which may be easily and efficiently manufactured and marketed.

It is further object of the present invention to provide a new and improved compartmentalized vitamin dispensing system which is of durable and reliable constructions.

An even further object of the present invention is to provide a new and improved compartmentalized vitamin dispensing system which is susceptible of a low cost of manufacture with regard to both materials and labor, and which accordingly is then susceptible of low prices of sale to the consuming public, thereby making such compartmentalized vitamin dispensing system economically available to the buying public.

Still yet another object of the present invention is to provide a new and improved compartmentalized vitamin dispensing system which provides in the apparatuses and methods of the prior art some of the advantages thereof, while simultaneously overcoming some of the disadvantages normally associated therewith.

Still another object of the present invention is to dispense controlled quantities of vitamins and minerals in liquid and solid forms from the individual compartments of the apparatus.

Lastly, it is an object of the present invention to provide a new and improved anew and improved compartmentalized vitamin dispensing system for use in association with vitamins and minerals in either liquid or powdered form, the apparatus comprising, in combination: a housing unit formed as a hollow rectangular shaped box, the hollow interior being divided into a plurality of dispensing columns, the housing unit including a lower wall angled in a downward direction from each side edge to the approximate centerpoint thereof; a plurality of dispensing tubes, each tube being positioned in a dispensing column and adapted to contain vitamins and minerals therein, each tube including an aperture at its lowermost extent; and a plurality of dispensing knobs, each including a valve rotatably coupled below the dispensing tubes, each valve including a device to retain and dispense materials residing in the dispensing tubes upon turning of the knobs, materials dispensed being caused to slide down the lower wall, a spout extending through the center point of the lower wall, the spout including a device to permit retainment and dispensing of materials therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
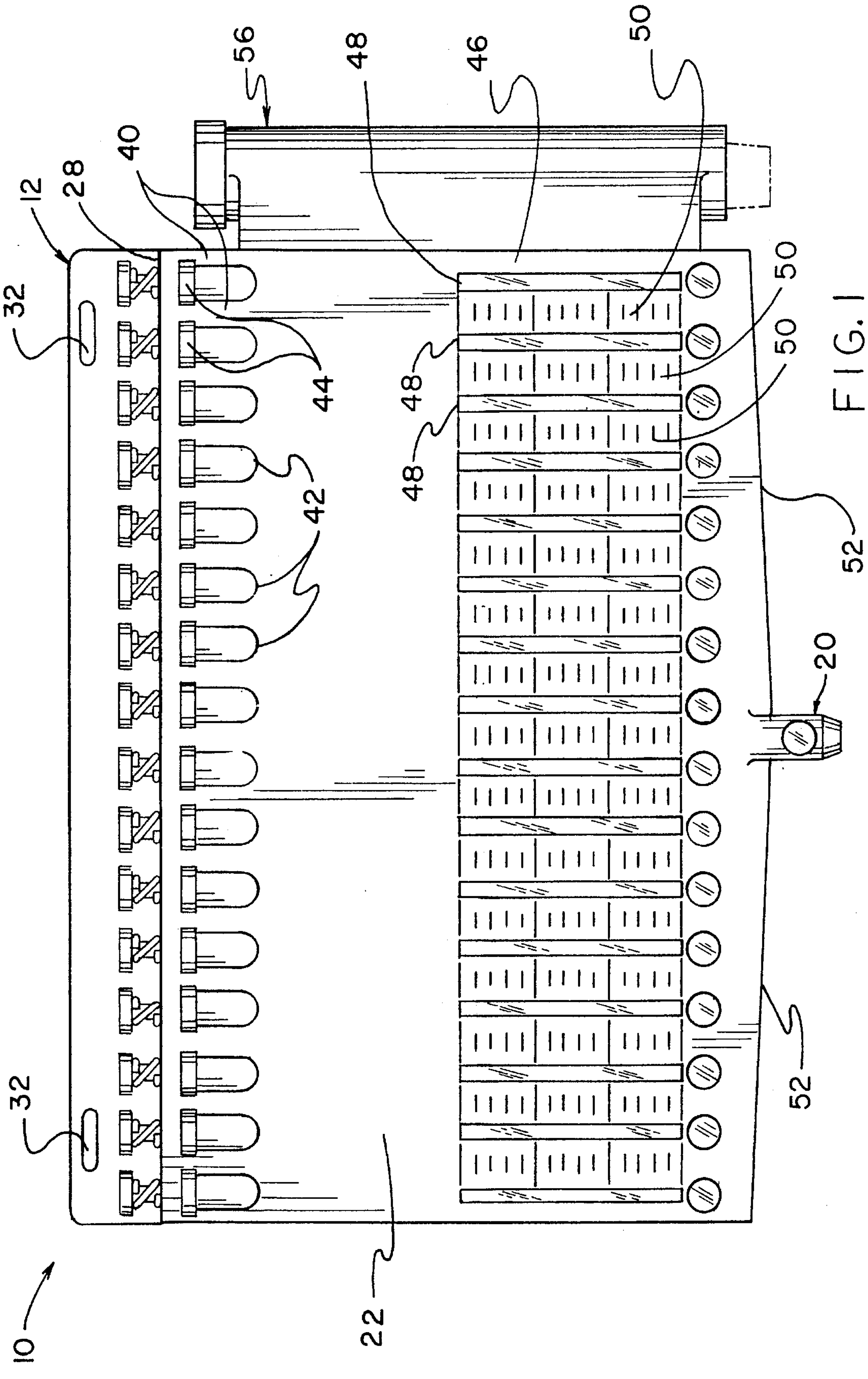
FIG. 1 is a perspective view of the preferred embodiment of the compartmentalized vitamin dispensing system constructed in accordance with the principles of the present invention.

With reference now to the drawings, and in particular to FIG. 1 thereof, the preferred embodiment of the new and improved compartmentalized vitamin dispensing system embodying the principles and concepts of the present invention and generally designated by the reference numeral 10 will be described.

The present invention, the compartmentalized vitamin dispensing system 10 is comprised of a plurality of components. Such components in their broadest context include a housing unit 12, a plurality of dispensing tubes 14, a plurality of plunger devices 16, a plurality of dispensing knobs 18, and a dispensing spout 20. Such components are individually configured and correlated with respect to each other so as to attain the desired objective. The compartmentalized vitamin dispensing system is adapted for use in associations with vitamins and minerals in either liquid or powdered form.

More specifically, the housing unit 12 is formed as a hollow generally rectangular shaped box with a front wall 22, a rear wall 24, two side walls 26, an upper wall 28 and a lower wall 30. The housing unit is fabricated of plastic in the preferred embodiment. In alternative embodiments the housing unit is fabricated of various elastomeric materials and configured in varying shapes. Note FIG. 1.

Figure 2:
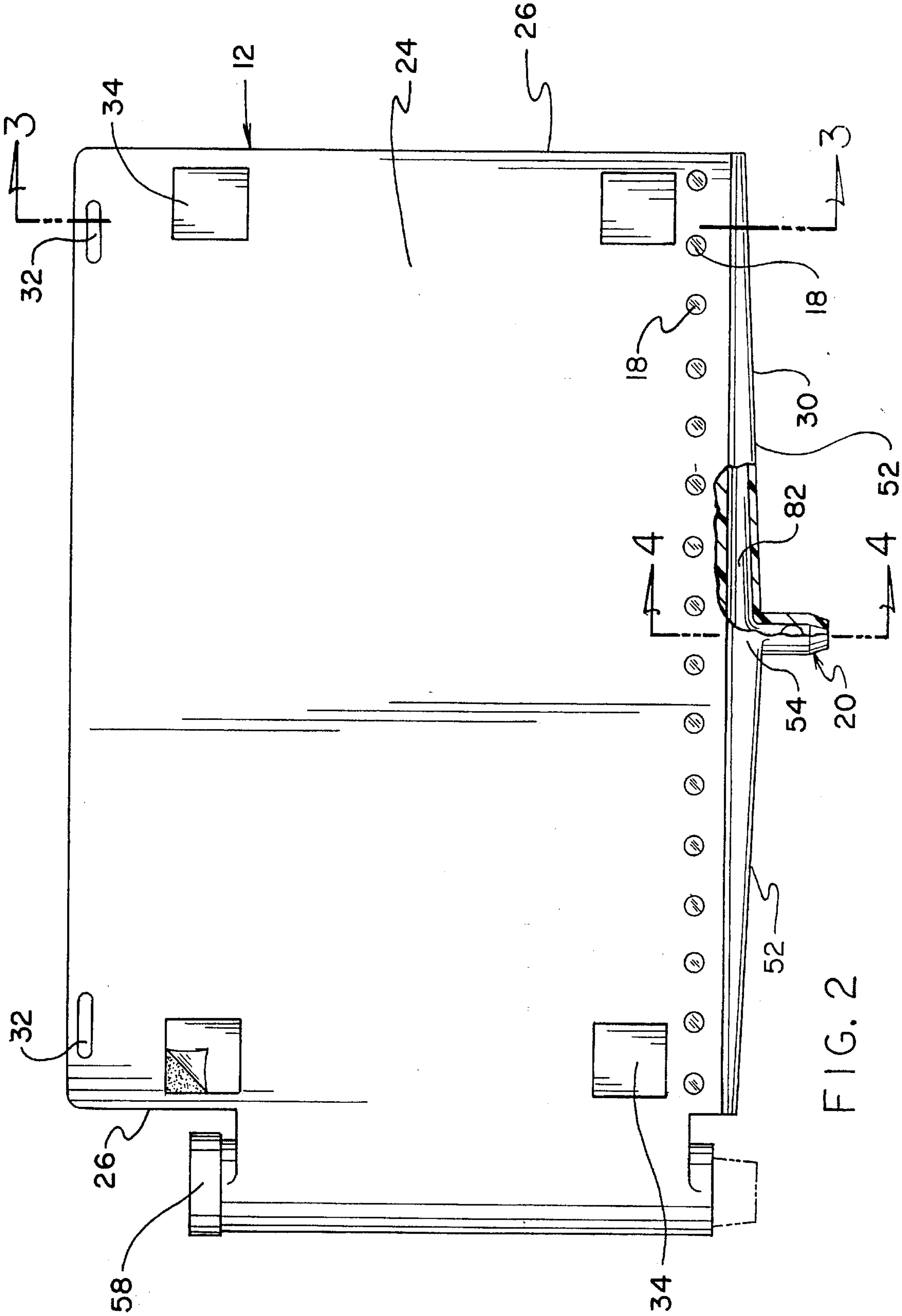
FIG. 2 is a rear perspective illustration of the compartmentalized vitamin dispensing system illustrating the self-adhesive cushions of the apparatus.

The rear wall 24 has a greater height than the front wall and includes two hanging slots 32 positioned adjacent to its uppermost extent. The rear wall also includes a plurality of self-adhesive cushions 34 in the preferred embodiment. To hang the apparatus the user would first affix two standard picture hanging hooks to a mounting wall. The user would then remove the covering from the self-adhesive material and position the apparatus upon the wall with the hang slots secured within the hooks. Note FIGS. 1 and 2.

Figure 3:
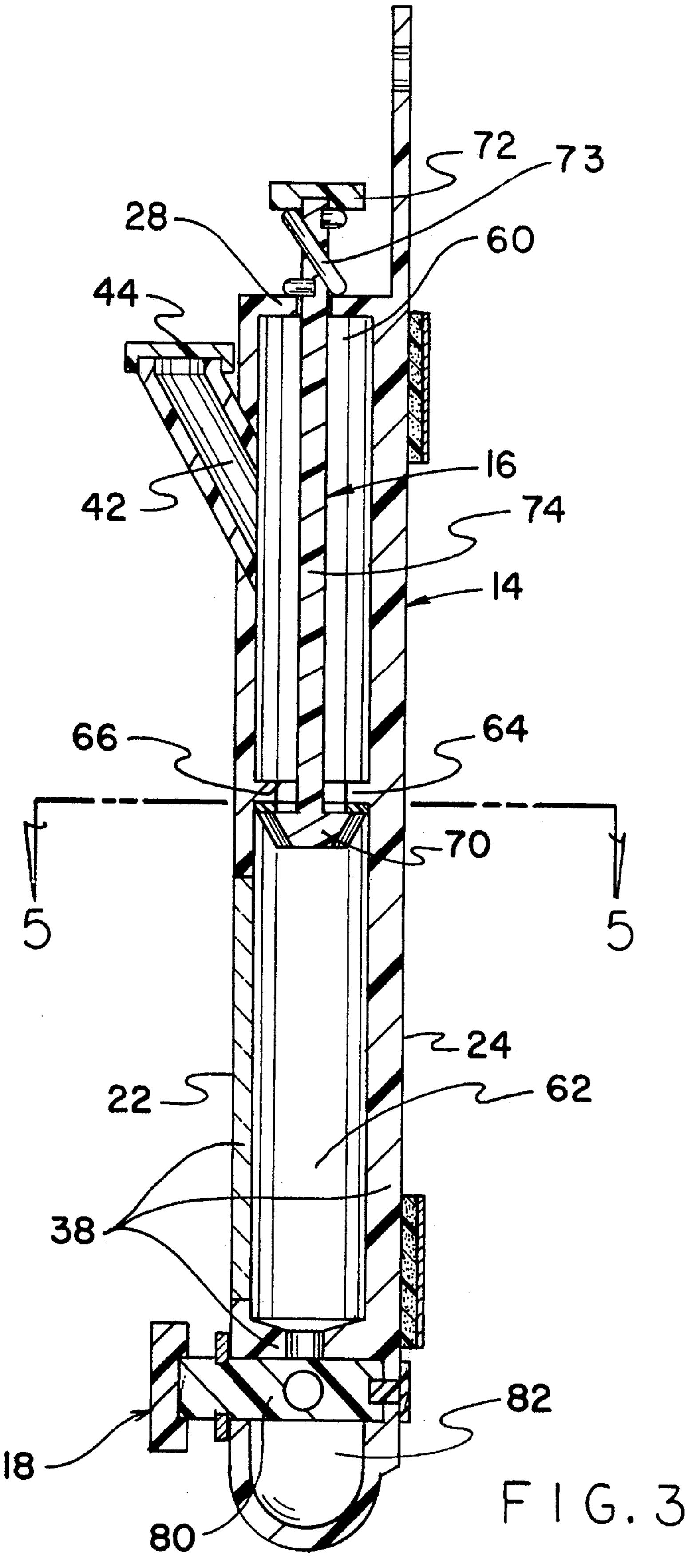
FIG. 3 is a cross sectional view of the compartmentalized vitamin dispensing system taken along section line 3—3 of FIG. 2 and illustrating the structure of the individual compartments of the apparatus.
Figure 4:
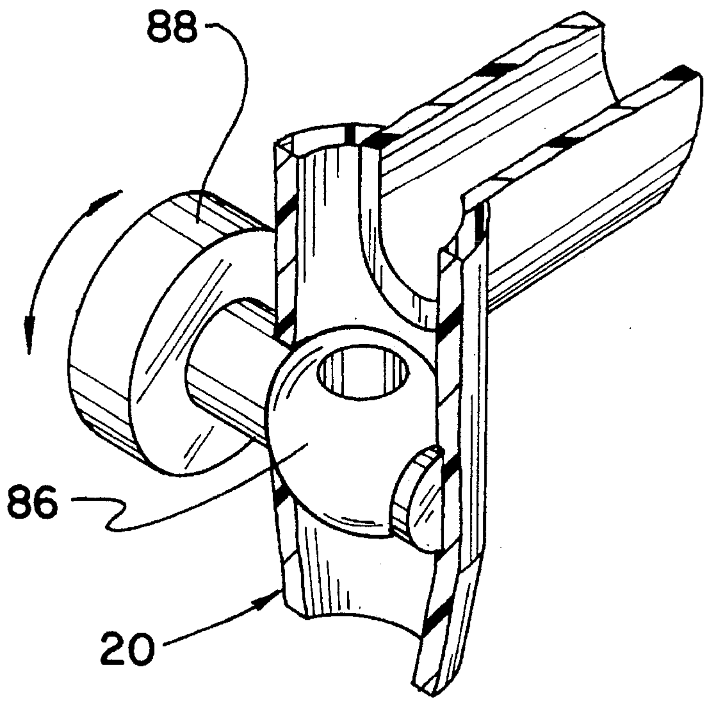
FIG. 4 is a cross sectional view taken along section line 4—4 of FIG. 2 and illustrating the dispensing spout of the apparatus.

The hollow interior of the housing unit 12 is divided into a plurality of dispensing columns 38. Adjacent dispensing columns are separated by vertical dividers to prevent the mixing of vitamins and minerals positioned therein. This configuration permits the user to store many different types of vitamins and minerals within the apparatus. A total of sixteen dispensing columns and associated tubes are included in the preferred embodiment. In alternative embodiments anywhere from two to fifty columns and tubes are included. The front wall 22 has an upper region 40 which includes a plurality of insertion tubes 42 extending within the dispensing columns and into the associated dispensing tubes. Each insertion tube 42 includes a removable cap 44. The insertion tubes permit the placement of liquid or powdered vitamins and minerals into each dispensing tube. Note FIGS. 1 and 3.

The lower region 46 of the front wall includes a plurality of elongated transparent windows 48 and incremental markers 50. The lower wall 52 is angled in a downward direction from each side edge to the approximate centerpoint 54 of it. One side wall includes a generally cylindrical shaped cup dispenser 56. The dispenser is formed in an elongated generally cylindrical configuration with a hollow interior. A removable cap 58 is positioned at its upper extent to permit the insertion of disposable cups therein. An aperture is positioned at its lower extent to permit convenient dispensing of individual cups. Note FIGS. 1 and 2.

A plurality of dispensing tubes 14 are formed in an elongated cylindrical configuration. Each tube 14 is positioned through the upper wall 28 and secured in a dispensing column. Each tube 14 includes an upper section 60, a lower section 62 and a central section 64 therebetween. Each upper section is formed contiguously with an insert tube to permit the replenishment of vitamins and minerals within the dispensing tubes. Each central section includes a horizontal plate 66 with a plurality of apertures. When replenishment is necessary the user simply removes the cap from an insertion tube and pours the material into it. The material then flows through the plate and into the lower section of the dispensing tube. The lowermost extent of the lower section includes an aperture to permit dispensing of materials housed within the dispensing tubes. Note FIG. 3.

A plurality of plunger devices 16 are comprised of a head 70, a knob 72 having resilient means 73 and a cylindrical rod 74 between them. A plunger device 16 is positioned axially within the upper and central sections of each dispensing tube 14 with the head located slightly below the centrally positioned plate. The plunger 16 is adapted to be pushed downward to force fluid and powder positioned within the tube in a downward direction. The resilient means force the plunger 16 back to its original position after depression. The length and configuration of the plunger device permit compacting of material housed in the tubes. This insures that a consistent amount of vitamin or mineral material are dispensed after each turn of a dispensing knob. Note FIG. 3.

A plurality of dispensing knobs 18 which each include a valve rotatably coupled below the dispensing tubes 14 of the apparatus. The valves include means 80 to retain and dispense materials residing in the dispensing tubes 14 upon turning of the knobs. A rounded trough is positioned below the valves and affixed to the downwardly angled lower wall. The trough has a smooth interior. The trough causes materials deposited within it to roll toward the centerpoint of the lower wall. The knob includes means to preset the amount of vitamins and minerals to be dispensed upon turning of the knob. Note FIGS. 1 and 3.

Figure 5:
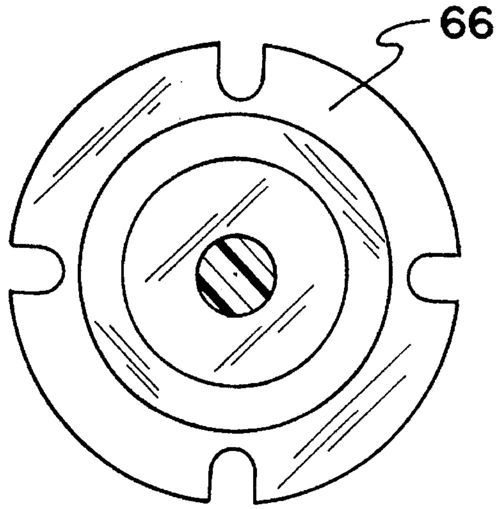
FIG. 5 is a cross sectional view taken along section line 5—5 of FIG. 3 and illustrating the structure of the plate dividing the upper and lower sections of the dispensing tubes of the apparatus.

A dispensing spout 20 is formed in a cylindrical configuration and extends vertically downward from the approximate centerpoint of the lower wall. The spout 20 includes an axial aperture with a valve 86 positioned therein. The valve is rotatably coupled within the spout 20 and includes a handle 88 extending through the spout 20. When vitamins and minerals are deposited into the trough they slide toward the center point of the apparatus and accumulate there. The valve includes means to retain and dispense the accumulated vitamins and minerals upon turning of the handle. A disposable cup is then removed and positioned under the spout. The apparatus permits users to dispense a plurality of preset vitamins and mineral doses simultaneously. Note FIGS. 1 and 5.

The compartmentalized vitamin dispensing system is a device for dispensing vitamins or minerals in either a liquid or powdered form. The apparatus apportions specific amounts of several vitamins simultaneously into a spout for collection in a disposable cup. The apparatus is constructed primarily of plastic and includes a plurality of vertically oriented dispensing tubes. Each is made from a material that is suitable for storing foods, such as polypropylene. The tubes hold a variety of different vitamins without mixing them.

An adjustable control at the top of each one determines the amount of material dispensed in a single cycle, based on the user's needs. The bottom of the apparatus includes a trough that leads to a centrally located spout. A valve in each control knob below the dispensing tubes permits the deposit of materials into the trough. The material then flows to the spout for deposit into a cup. A cup holder with a stack of disposable cups is attached to the side of the unit.

In use, the liquified or powdered vitamins are first poured into the dispensing tubes. Then the control knobs are set to administer specific amounts of each one by volume. At the time of day when the vitamins are to be taken, a single knob is activated which releases the materials to a collection cup. It is very fast and easy to use. It makes dispensing a wide variety of vitamins easier by eliminating the separate measuring sequences normally required. Anyone who takes liquid vitamins should appreciate its clear advantages.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved compartmentalized vitamin dispensing system for use in association with vitamins and minerals in either liquid or powdered form, the apparatus comprising, in combination:

a housing unit formed as a hollow generally rectangular shaped box with a front wall, a rear wall, two side walls, an upper wall and a lower wall, the rear wall having a greater height than the front wall and including two hanging slots positioned adjacent to its uppermost extent, the hollow interior of the housing unit being divided into a plurality of dispensing columns, adjacent dispensing columns being separated by vertical dividers, the front wall having an upper region including a plurality of insertion tubes extending within the dispensing columns, each tube including a removable cap, the insertion tubes permitting the placement of liquid or powdered vitamins and minerals into each dispensing column, the lower region of the front wall including a plurality of elongated transparent windows and incremental markers, the lower wall being angled in a downward direction from each side edge to the approximate centerpoint thereof, one side wall including a generally cylindrical shaped cup dispenser, the dispenser adapted to retain and dispense disposable cups therefrom;

a plurality off, dispensing tubes, each formed in an elongated cylindrical configuration, each dispensing tube being positioned through the upper wall and secured in a dispensing column, each dispensing tube including an upper section, a lower section and a central section therebetween, each upper section being formed contiguously with an insertion tube to permit the replenishment of vitamins and minerals residing in the lower section of each dispensing tube, the lowermost extent of the lower section including an aperture;

a plurality of plunger devices, each comprising a head, a knob having resilient means and a cylindrical rod therebetween, a plunger device being positioned axially within the upper and central sections of each dispensing tube with the head located at the approximate centerpoint thereof, the plunger adapted to be pushed downward to force fluid and powder positioned within the dispensing tubes in a downward direction, the resilient means forcing the plunger back to its original position after depression;

a plurality of dispensing knobs, each including a valve rotatably coupled below the dispensing tubes of the apparatus, the valves including means to retain and dispense materials residing in the dispensing tubes upon turning of the knobs, a rounded trough being positioned below the valves and affixed to the downwardly angled lower wall, the trough causing materials deposited therein to roll toward the centerpoint of the lower wall, the knob including means to preset the amount of vitamins and minerals to be dispensed upon turning of the knob; and a dispensing spout formed in a cylindrical configuration and extending vertically from the approximate centerpoint of the lower wall, the spout including an axial aperture with a valve positioned therein, the valve being rotatably coupled within the spout and including a handle extending through the spout, the valve including means to retain and dispense vitamins and minerals upon turning of the handle.

2. A new and improved compartmentalized vitamin dispensing system for use in association with vitamins and minerals in either liquid or powdered form, the apparatus comprising, in combination:

a housing unit formed as a hollow rectangular shaped box, the hollow interior being divided into a plurality of dispensing columns with means to permit insertion of vitamins and minerals therein, the housings unit including a lower wall angled in a downward direction from each side edge to the approximate centerpoint thereof;

a plurality of dispensing tubes, each tube being positioned in a dispensing column and adapted to contain vitamins and minerals therein, each tube including an aperture at its lowermost extent; and a plurality of dispensing knobs, each knob including a valve rotatably coupled below a dispensing tube, each valve including a device to retain and dispense materials residing in the dispensing tubes upon turning of the knobs, materials dispensed being caused to slide down the lower wall, a spout extending through the center point of the lower wall, the spout including a device to permit retainment and dispensing of materials therethrough.

3. The apparatus as set forth in claim 2 wherein the housing unit includes a front wall having an upper region, the means for insertion of vitamins and minerals into the dispensing tubes being a plurality of insertion tubes extending within the dispensing tubes, each insertion tube including a removable cap, the insertion tubes permitting the placement of varying quantities of liquid or powdered vitamins and minerals into each dispensing tube.

4. The apparatus as set forth in claim 2 and further including:

a plurality of plunger devices, each comprising a head, a knob having resilient means and a cylindrical rod therebetween, a plunger device being positioned axially within each dispensing tube, the plunger devices adapted to be pushed downward to force fluid and powder positioned within the dispensing tube in a downward direction, the materials being forced through the apertures in the lowermost extent of the dispensing tubes.

5. The apparatus as set forth in claim 2 wherein the housing unit includes a front wall having a lower region which includes a plurality of elongated transparent windows and incremental markers.

6. The apparatus as set forth in claim 2 wherein the housing unit includes at least one side wall having a generally cylindrical shaped cup dispenser affixed thereto, the dispenser adapted to retain and dispense disposable cups therefrom.

* * * * *